United States Patent
Matsuzaka (10) Patent No.: US 6,757,013 B2
(45) Date of Patent: *Jun. 29, 2004

(54) IMAGE PICKUP APPARATUS WITH ELECTRONIC AND OPTICAL ZOOM FUNCTIONS

(75) Inventor: Kazuhiro Matsuzaka, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 122 days.

(21) Appl. No.: 08/889,860

(22) Filed: Jul. 8, 1997

(65) Prior Publication Data

US 2001/0040630 A1 Nov. 15, 2001

(30) Foreign Application Priority Data

Jul. 22, 1996 (JP) .............................................. 8-192196

(51) Int. Cl.⁷ .............................................. H04N 5/262
(52) U.S. Cl. .................................................. 348/240.1
(58) Field of Search ................................ 348/240, 358, 348/347

(56) References Cited

U.S. PATENT DOCUMENTS

| | | | | |
|---|---|---|---|---|
| 4,843,475 A | * | 6/1989 | Imai | 358/225 |
| 5,113,214 A | * | 5/1992 | Nagata et al. | 354/402 |
| 5,420,632 A | * | 5/1995 | Yamagiwa | 348/240 |
| 5,502,484 A | * | 3/1996 | Okada | 348/208 |

FOREIGN PATENT DOCUMENTS

| | | | | | |
|---|---|---|---|---|---|
| JP | 4-90274 | * | 3/1992 | .......... | H04N/5/262 |
| JP | HEI 3-151449 | * | 12/1992 | .......... | H04N/5/228 |
| JP | 5-130478 | | 5/1993 | | |
| JP | 5-284404 | * | 10/1993 | .......... | H04N/5/232 |
| JP | 541092 A2 | * | 12/1993 | .......... | H04N/5/232 |
| JP | 579165 A1 | * | 1/1994 | .......... | H04N/5/232 |

* cited by examiner

Primary Examiner—Wendy R. Garber
Assistant Examiner—Rashawn N. Tillery
(74) Attorney, Agent, or Firm—Fitzpatrick, Cella, Harper & Scinto (57) ABSTRACT

An image pickup apparatus simultaneously performs electronic zooming and optical zooming to determine a view angle for an image, and substantially transfers control of the view angle to the optical zoom, while maintaining the view angle, so that the amount of control of the view angle by the electronic zoom decreases.

10 Claims, 10 Drawing Sheets

IMAGE PICKUP APPARATUS WITH ELECTRONIC AND OPTICAL ZOOM FUNCTIONS

BACKGROUND OF THE INVENTION

1. Field of the Invention

The present invention relates to image pickup apparatuses such as video cameras, electronic still cameras, and digital still cameras.

2. Description of the Related Art

Conventional image pickup apparatuses such as video cameras, electronic still cameras and digital still cameras employ optical zooming which optically enlarges an image with an optical unit like a zoom lens, and electronic zooming which enlarges an image by electronic processing. The electronic zoom introduces deterioration in the quality of the image. Thus, for the resolution of the image to be maintained, a technique for using the electronic zoom after optically enlarging the image as large as possible is generally used.

Figure 10:
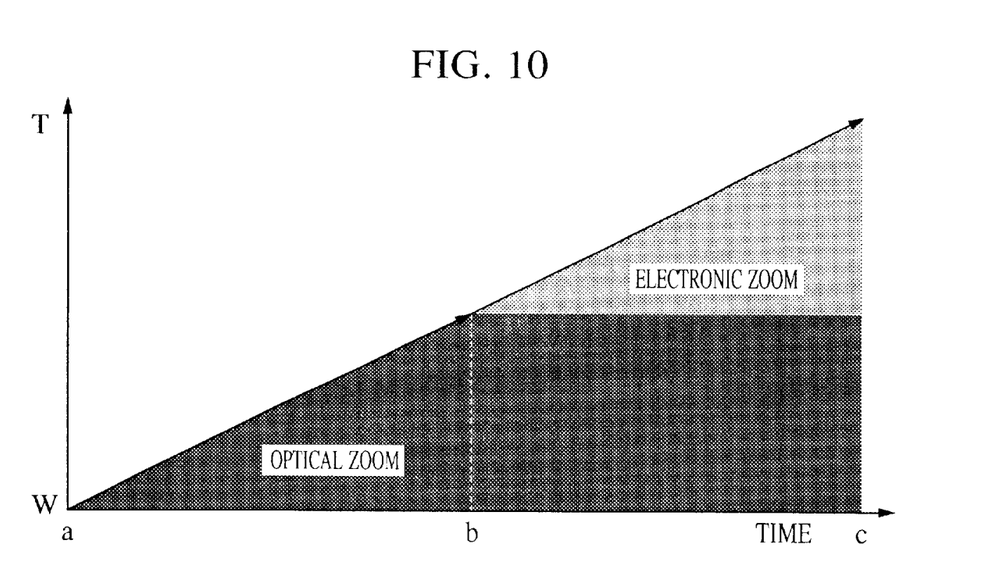
FIG. 10 is a schematic chart showing the conventional operations of electronic zooming and optical zooming.

FIG. 10 shows a schematic chart illustrating such optical and electronic zoom operations in an image pickup apparatus like a video camera. Its horizontal axis represents the operating time of a zoom switch (not shown), while its vertical axis represents changes in view angle from a wide angle (shown as W) to a telephoto angle (shown as T). Initially, between point a where enlargement of an image begins and point b, only optical zooming is performed to its limit. If further enlargement of the image is needed, electronic zooming is performed from point b to point c so that a desired view angle is obtained.

In optical enlargement of the image, the image can hardly be rapidly enlarged because the zoom lens is mechanically driven. If such rapid enlargement of the image is needed, a technique for simultaneously performing the optical zooming and rapid electronic zooming which uses electric operations is schematically shown in FIG. 11.

However, rapid zooming can hardly be performed in a range where only the optical zooming (which mechanically drives lenses) is performed.

Figure 11:
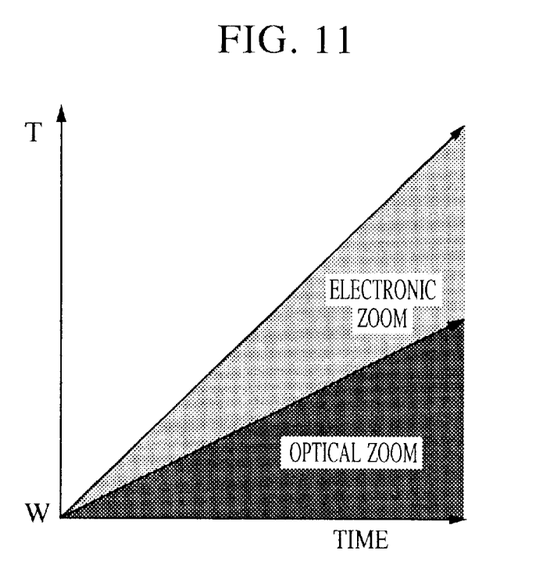
FIG. 11 is a schematic chart showing the conventional operations of electronic zooming and optical zooming.

In addition, although the image can rapidly be enlarged by the zoom operation as shown in FIG. 11, the problem of deterioration in resolution, caused by the electronic zoom, still remains.

SUMMARY OF THE INVENTION

Accordingly, in view of the foregoing problems, it is an object of the present invention to provide an image pickup apparatus with a rapid zoom function, in which deterioration in the image quality, caused by operation of the zoom function, is minimized.

According to an aspect of the present invention, the foregoing object has been achieved through the provision of an image pickup apparatus including: first adjustment means for optically adjusting a view angle; second adjustment means for electronically adjusting the view angle; commanding means for giving a view-angle change command; first control means for causing the second adjustment means to adjust the view angle based on the view-angle change command; and second control means for controlling the adjustment of the view angle so as to be substantially transferred from the second adjustment means to the first adjustment means, while maintaining the view angle commanded by the commanding means.

According to another aspect of the present invention, the foregoing object has been achieved through the provision of an image pickup apparatus including: first adjustment means for optically adjusting a view angle; second adjustment means for electronically adjusting the view angle; commanding means for giving a view-angle change command; first control means for simultaneously driving the first adjustment means and the second adjustment means in order to change the view angle to a view angle based on the view-angle change command provided by the commanding means; and second control means for controlling the adjustment of the view angle so as to be substantially transferred from the second adjustment means to the first adjustment means, while maintaining the view angle corresponding to the view-angle change command.

According to still another aspect of the present invention, the foregoing object has been achieved through the provision of an image pickup apparatus including: a zoom lens for optically adjusting a view angle; an image pickup device for capturing the image of a subject through the zoom lens; an electronic zoom processing circuit for the electronic zoom processing of an output signal obtained from the image pickup device; a zoom switch for giving a view-angle change command; a first control circuit for causing said electronic zoom processing circuit to adjust the view angle based on the view-angle change command; and a second control circuit for controlling the adjustment of the view angle so as to be substantially transferred from the electronic zoom processing circuit to the zoom lens, while maintaining the view angle corresponding to the view angle change command.

According to a further aspect of the present invention, the foregoing object has been achieved through the provision of an image pickup apparatus including: a zoom lens for optically adjusting a view angle; an image pickup device for capturing the image of a subject through the zoom lens; an electronic zoom processing circuit for the electronic zoom processing of an output signal obtained from the image pickup device; a zoom switch for giving a view-angle change command; a first control circuit for causing the zoom lens and the electronic zoom processing circuit to adjust the view angle based on the view-angle change command; and a second control circuit for controlling the adjustment of the view angle so as to be substantially transferred from the electronic zoom processing circuit to the zoom lens, while maintaining the view angle corresponding to the view-angle change command.

According to a still further aspect of the present invention, the foregoing object has been achieved through the provision of an image pickup apparatus including: a zoom lens for optically adjusting a view angle; an image pickup device for capturing the image of a subject through the zoom lens; an electronic zoom processing circuit for the electronic zoom processing of an output signal from the image pickup device; an auto-zoom switch for setting the size of the subject within a screen to a predetermined size; a memory in which the magnification of the image of the subject and the distance to the subject, which have been set by the auto-zoom switch, are stored; an operation processing circuit for calculating a view angle to maintain the size of the subject image (based on a change between the distance to the subject and the present distance to the subject) and the magnification of the subject image, which are stored in the memory; a first control circuit for driving the electronic zoom processing circuit to obtain the view angle calculated by the operation processing circuit; and a second control circuit for controlling the adjustment of the view angle so as to be substantially transferred from the electronic zoom processing circuit to the zoom lens, while maintaining the view angle calculated by the operation processing circuit.

According to another aspect of the present invention, the foregoing object has been achieved through the provision of an image pickup apparatus including: a zoom lens for optically adjusting a view angle; an image pickup device for capturing the image of a subject through the zoom lens; an electronic zoom processing circuit for the electronic zoom processing of an output signal from the image pickup device; an auto-zoom switch for setting the size of the subject within a screen to a predetermined size; a memory in which the magnification of the image of the subject and the distance to the subject (which have been set by the auto-zoom switch) are stored; an operation processing circuit for calculating a view angle to maintain the size of the subject image (based on a change between the distance to the subject and the present distance to the subject) and the magnification of the subject image, which are stored in the memory; a first control circuit for simultaneously driving the zoom lens and the electronic zoom processing circuit to obtain the view angle calculated by the operation processing circuit; and a second control circuit for controlling the adjustment of the view angle so as to be substantially transferred from the electronic zoom processing circuit to the zoom lens, while maintaining the view angle obtained by the first control circuit.

According to an additional aspect of the present invention, the foregoing object has been achieved through the provision of a storage medium in which a program for adjusting a view angle for an image pickup apparatus is stored, the storage medium activating the processes of: executing electronic zooming in order to obtain a view angle based on a view-angle change command; and maintaining the view angle obtained by the electronic zooming by substantially driving a zoom lens, with the view angle unchanged.

According to a further aspect of the present invention, the foregoing object has been achieved through the provision of a storage medium in which a program for adjusting a view angle for an image pickup apparatus is stored, the storage medium activating the processes of: executing electronic zooming and the driving of a zoom lens in order to obtain a view angle based on a view-angle change command; and maintaining the view angle obtained by the electronic zooming by substantially driving the zoom lens, with the view angle unchanged.

Other objects and features of the present invention will become apparent from the following description and the attached drawings.

BRIEF DESCRIPTION OF THE DRAWINGS

FIG. 6, including FIGS. 6A and 6B is a flowchart showing a process in which the electronic zoom and the optical zoom are operated, according to the embodiment of the present invention.

DESCRIPTION OF THE PREFERRED EMBODIMENTS

An embodiment of the present invention will be described below.

Figure 1:
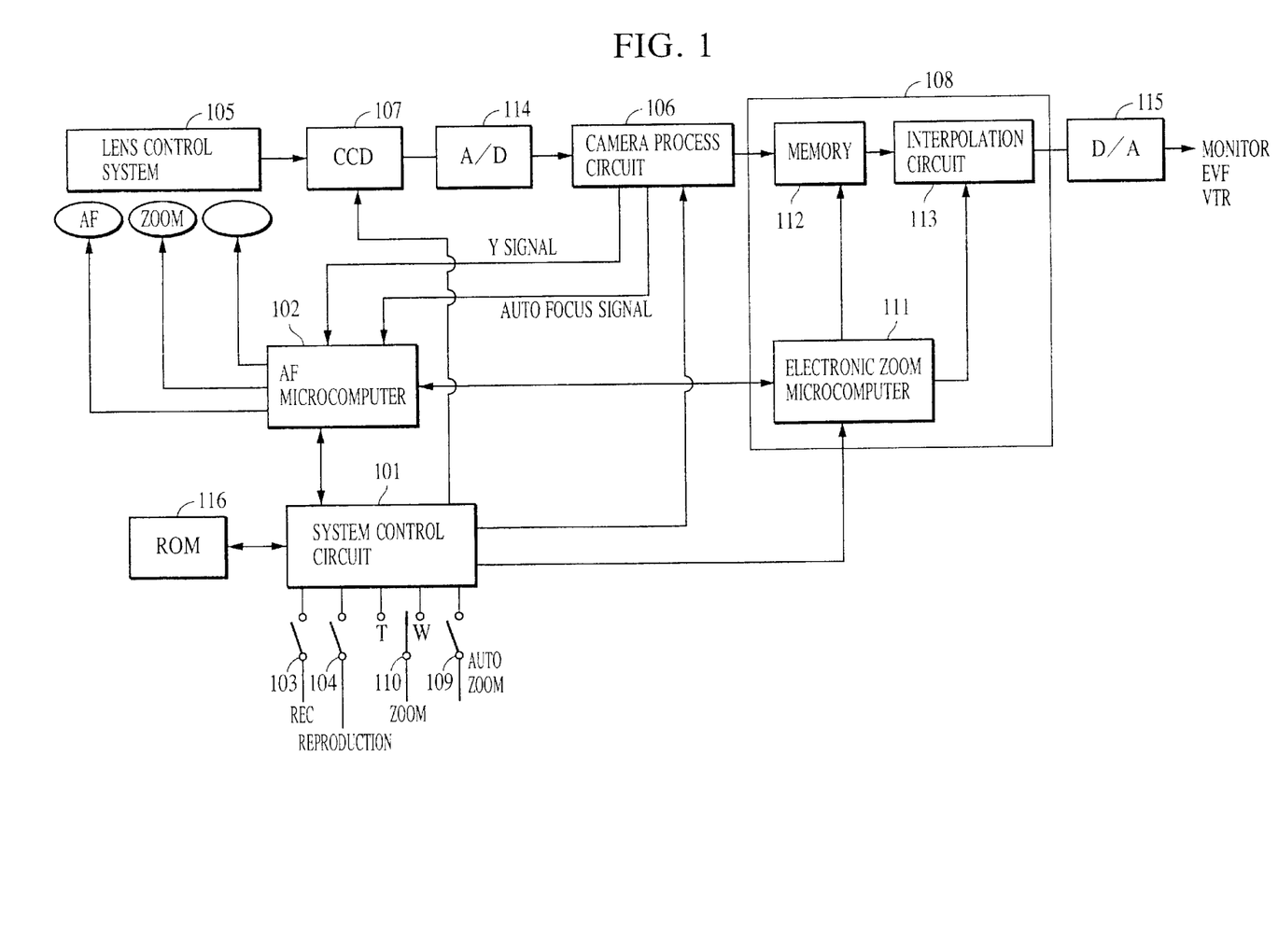
FIG. 1 is a block diagram showing an image pickup apparatus according to an embodiment of the present invention.

FIG. 1 shows a block diagram of an image pickup apparatus according to the embodiment.

A system control circuit 101 (including a CPU) controls recording and reproduction in accordance with on/off-operation commands from a recording switch (REC) 103, a reproduction switch 104 and so forth, and commands an auto-focus (AF) microcomputer 102 to adjust an AF operation, a diaphragm and so forth when controlling a zoom.

The commanded AF microcomputer 102 receives a Y signal as a brightness signal from a camera process circuit 106, and adjusts the diaphragm for lenses in a lens control system 105 so that the bright signal level is set to a predetermined level. The AF microcomputer 102 also controls the AF operation in the lens control system 105 by receiving an AF signal (e.g., high frequency component) varying with the focus condition in the brightness signal.

In accordance with a zoom operation command through a zoom switch 110, the lens control system 105 performs zooming.

In addition, when an auto-zoom switch 109 has been turned on by a user, the system control circuit 101 uses the AF microcomputer 102 to drive the lens control system 105 so that an image of a subject is captured with its size maintained identical at all times.

A charge-coupled device (CCD) 107 converts an image of the subject to an electrical image signal. An analog-to-digital conversion of the image signal converted by the CCD 107 is performed by an analog-to-digital (A/D) converter 114, and the obtained signal is converted by the camera process circuit 106 to a video signal such as a standardized NTSC signal or the like. At this time, if necessary, the image is enlarged by an electronic processing system 108. The digital-to-analog (D/A) conversion of the video signal is performed by a D/A converter 115, and the converted signal is displayed with an EVF or on a monitor, or is recorded on a recording medium like a magnetic tape.

Figure 2:
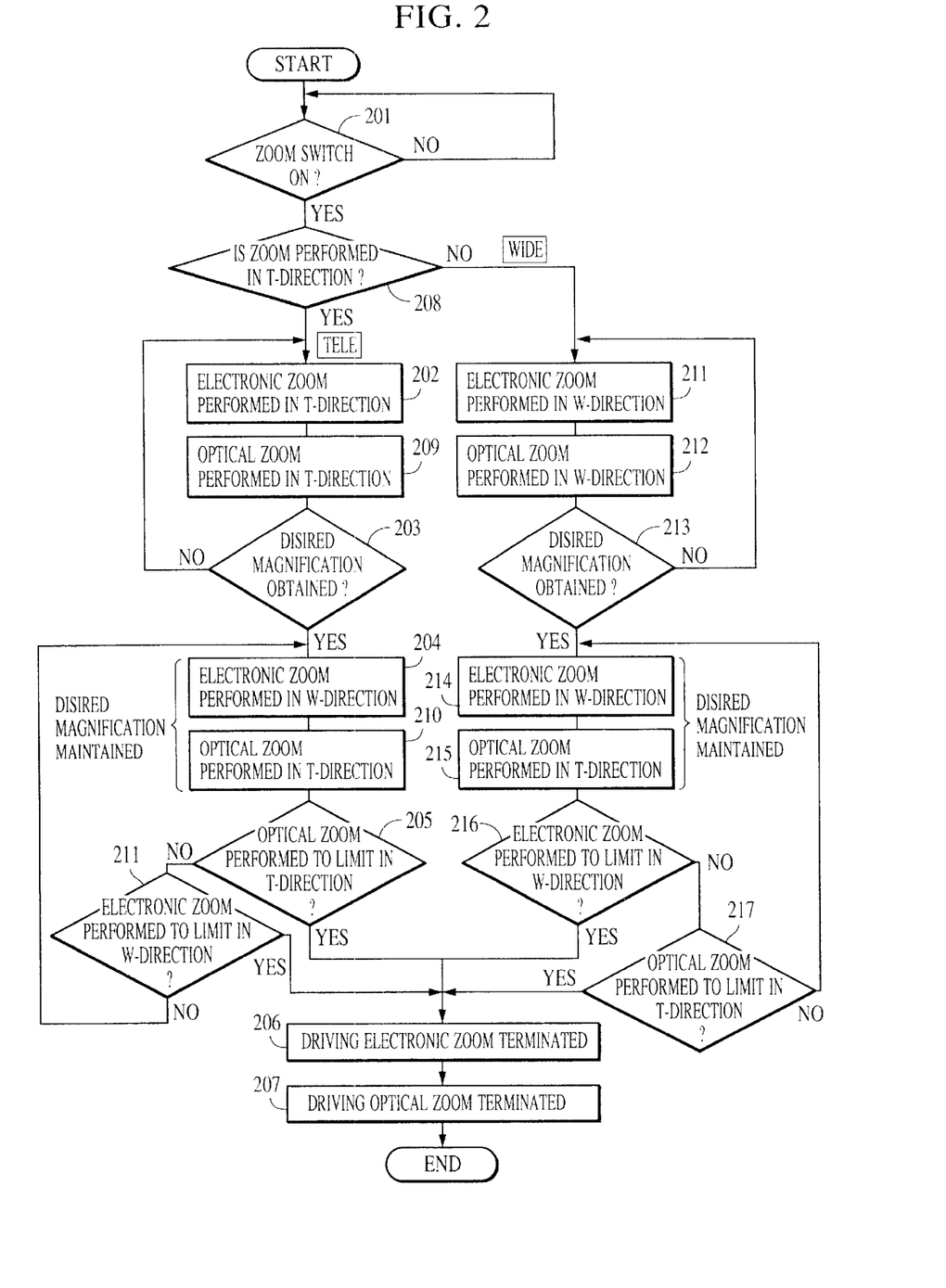
FIG. 2 is a flowchart showing a process in which optical zooming and electronic zooming according to the embodiment of the present invention are performed.
Figure 3A:
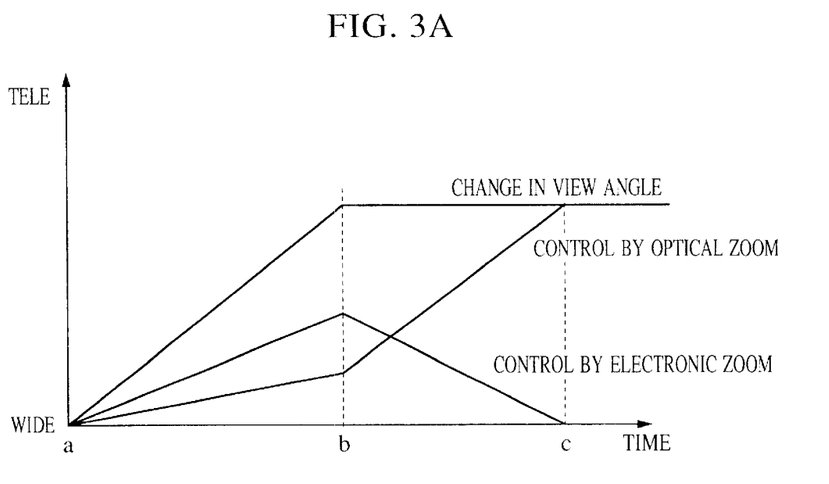
FIG. 3A is a schematic chart showing changes in view angle, caused by the combination of optical zooming and electronic zooming.
Figure 3B:
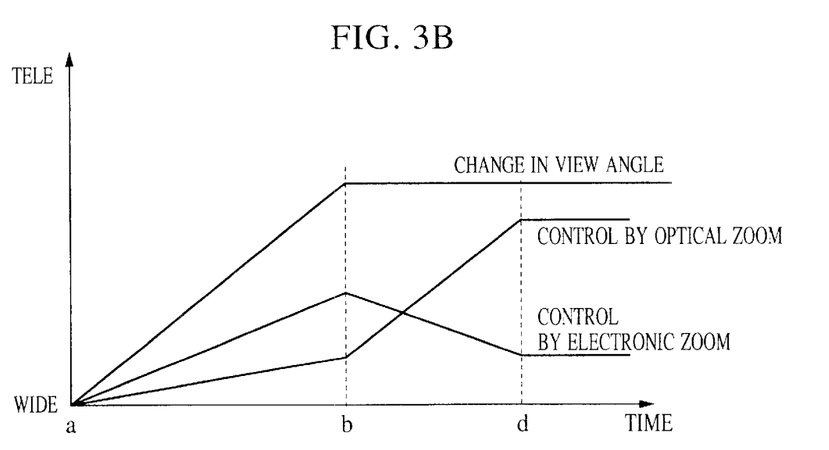
FIG. 3B is a schematic chart showing changes in view angle, caused by the combination of optical zooming and electronic zooming when the optical zooming has been performed to its limit.
Figure 4:
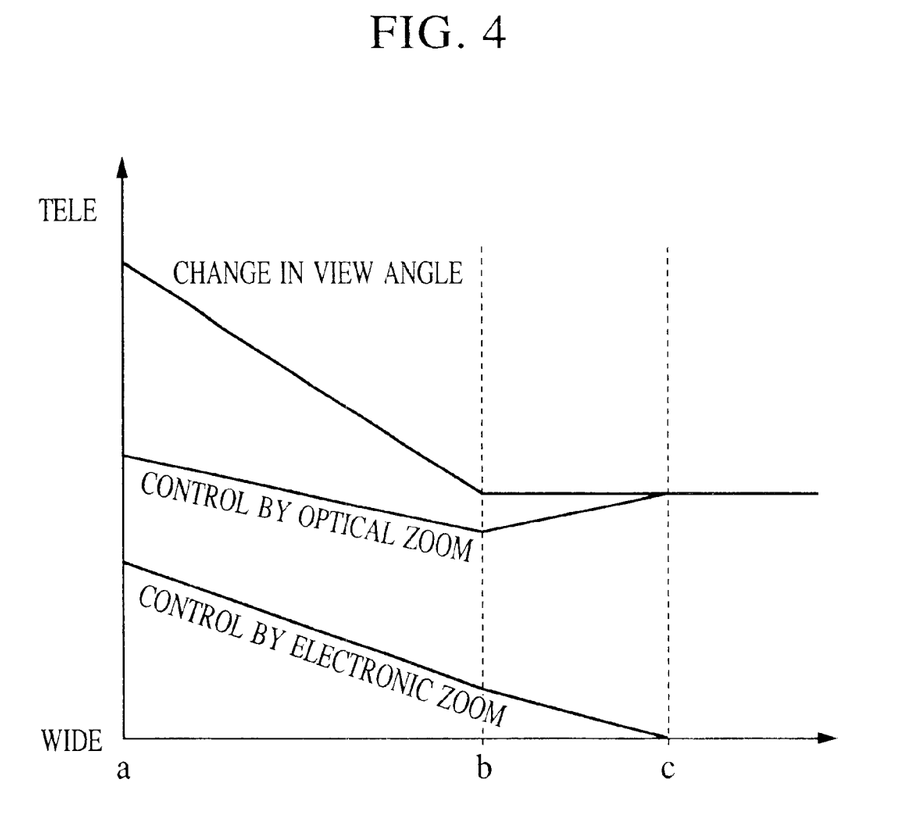
FIG. 4 is a schematic chart showing changes in view angle in the wide-direction, caused by the combination of optical zooming and electronic zooming.

The electronic zoom processing system 108 enlarges the video signal stored in a memory 112 with an electronic zoom microcomputer 111 to a desired view angle, and outputs a video signal in which gaps among scanning lines, caused by enlargement of the image, are interpolated by an interpolation circuit 113. The operation of an optical zoom (as first adjustment means in the lens control system 105), and the operation of an electronic zoom (as second adjustment means in the electronic zoom processing system 108) in the above-structured image pickup apparatus are shown in the flowchart of FIG. 2, and will be described by referring to FIGS. 3A, 3B and 4 showing changes in view angle and changes in the electronic zoom and the optical zoom which control the view angle. Zoom control by the system control circuit 101 which functions as the first and second means is performed by referring to programs stored in a read-only memory (ROM) 116.

The operation of a zoom switch 110 transfers a view-angle control command to the system control circuit 101 (step 201).

The process determines whether the operated zoom direction is a tele-direction (shown as "T-direction") toward to the tele end or a wide-direction (shown as "W-direction") toward to the wide end (step 208). If the direction is the tele-direction, the system control circuit 101 commands the AF microcomputer 102 and the electronic zoom microcomputer 111 to simultaneously perform optical zooming (step 209) and electronic zooming (step 202) in the tele (enlargement)-direction so that a view angle desired by the user is obtained as shown in FIG. 3A from point a to point b. Magnification is determined by multiplying the optical zoom magnification and electronic zoom magnification.

When the desired magnification has been obtained (step 203), the system control circuit 101 simultaneously performs the electronic zooming in the wide-direction (step 204) and the optical zooming in the tele-direction (step 210) so that they function oppositely, while maintaining the obtained magnification, so the magnification controlled by the optical zoom is dominant.

In step 205, the process determines whether or not the optical zoom has reached the tele end. If not, the process determines whether or not the electronic zoom has reached its width-directional end (step 211).

If the electronic zoom has not reached its wide end, the process returns to step 204 and the electronic zooming and the optical zooming continue to be oppositely performed.

When optical zooming is performed in the tele-direction and enlargement of the image by optical zooming in accordance with the properties of lenses has been performed to the magnification limit (step 205), in other words, when the optical zooming is performed to its tele end and a desired magnification has been obtained (step 203) (point d in FIG. 3B), the system control circuit 101 terminates operation of the optical zooming and the electronic zooming (steps 207 and 206, respectively).

When optical zooming and electronic zooming are oppositely performed in the tele and the wide-direction in steps 204 and 210, and zooming by the electronic zoom in the width-direction in step 211 has reached its limit, control of the view angle is transferred to the electronic zoom and the optical zoom (point c in FIG. 3A), and the system control circuit 101 terminates operation of the electronic zoom and the optical zoom (steps 206 and 207, respectively).

In addition, in step 208, if the process has determined that zooming is being performed in the wide (wide-angle)-direction, the electronic zoom and the optical zoom are simultaneously performed in the wide-direction (steps 211 and 212, respectively).

In step 213, if the zooming has reached the desired magnification (point b in FIG. 4), the system control circuit 101 oppositely performs the electronic zoom in the wide-direction and the optical zoom in the tele-direction, while maintaining the view angle of the desired magnification (steps 214 and 215, respectively).

In step 216, if electronic zooming is performed to its wide-angle limit, the operations of the electronic zoom and the optical zoom are terminated (point c in FIG. 4 shows a condition in which the electronic zoom has reached its zoom driving limit between points b and c).

In step 217, if magnification by optical zooming has reached its limit, the electronic zoom and optical zoom operations are terminated (steps 206 and 207, respectively).

As described above, by providing control means for performing optical zooming as the first adjustment means and electronic zooming as the second adjustment means to reach the view angle desired by the user, rapid zooming is realized. In addition, control of the view angle is transferred to the optical zoom, while maintaining the desired view angle. Thus, a pickup image having a preferable resolution can be provided. Moreover, when the desired view angle cannot be maintained because optical zooming has been performed to its limit, electronic zooming is performed. Thus, high resolution can be obtained with zooming performed at the highest possible speed and the desired view angle maintained.

According to the above description, zooming from point a to point b in FIG. 3 in order to obtain the view angle desired by the user is performed by both the electronic zoom and the optical zoom. However, the zooming may be performed by only the electronic zoom because the electronic zoom can be rapidly performed.

Figure 5A:
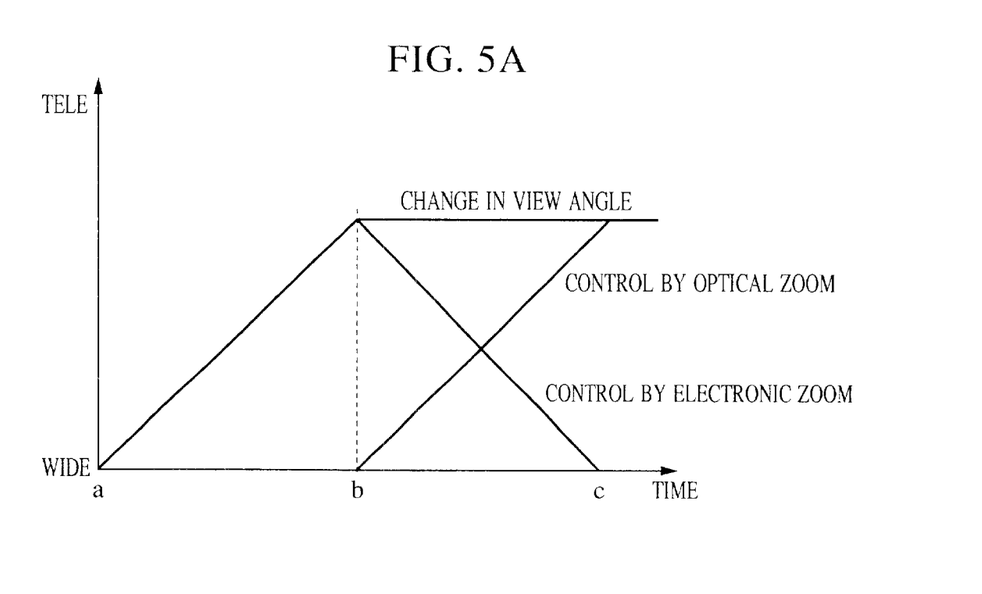
FIG. 5A is a schematic chart showing changes in view angle, caused by the combination of optical zooming and electronic zooming in the tele-direction.
Figure 5B:
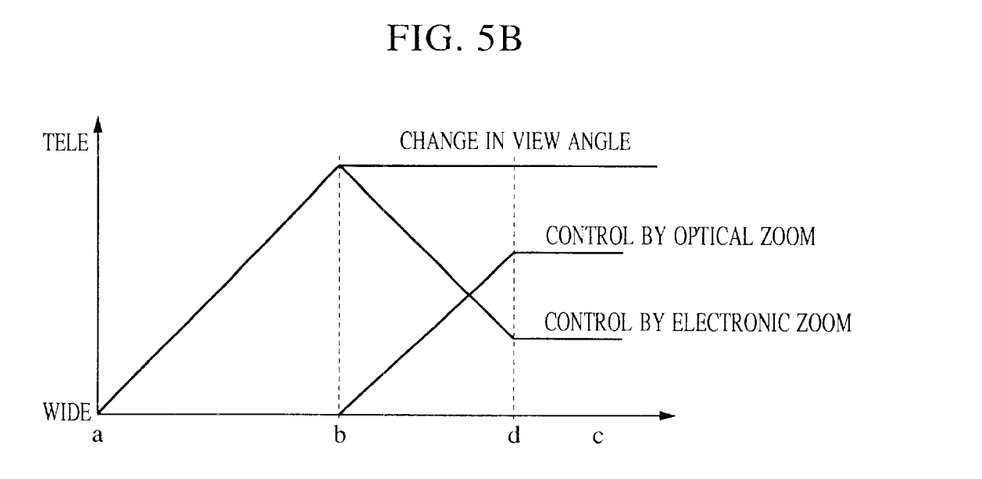
FIG. 5B is a schematic chart showing changes in the view angle, caused by the combination of optical zooming and electronic zooming when both zooms magnify to their limits.
Figures 6, 6A:
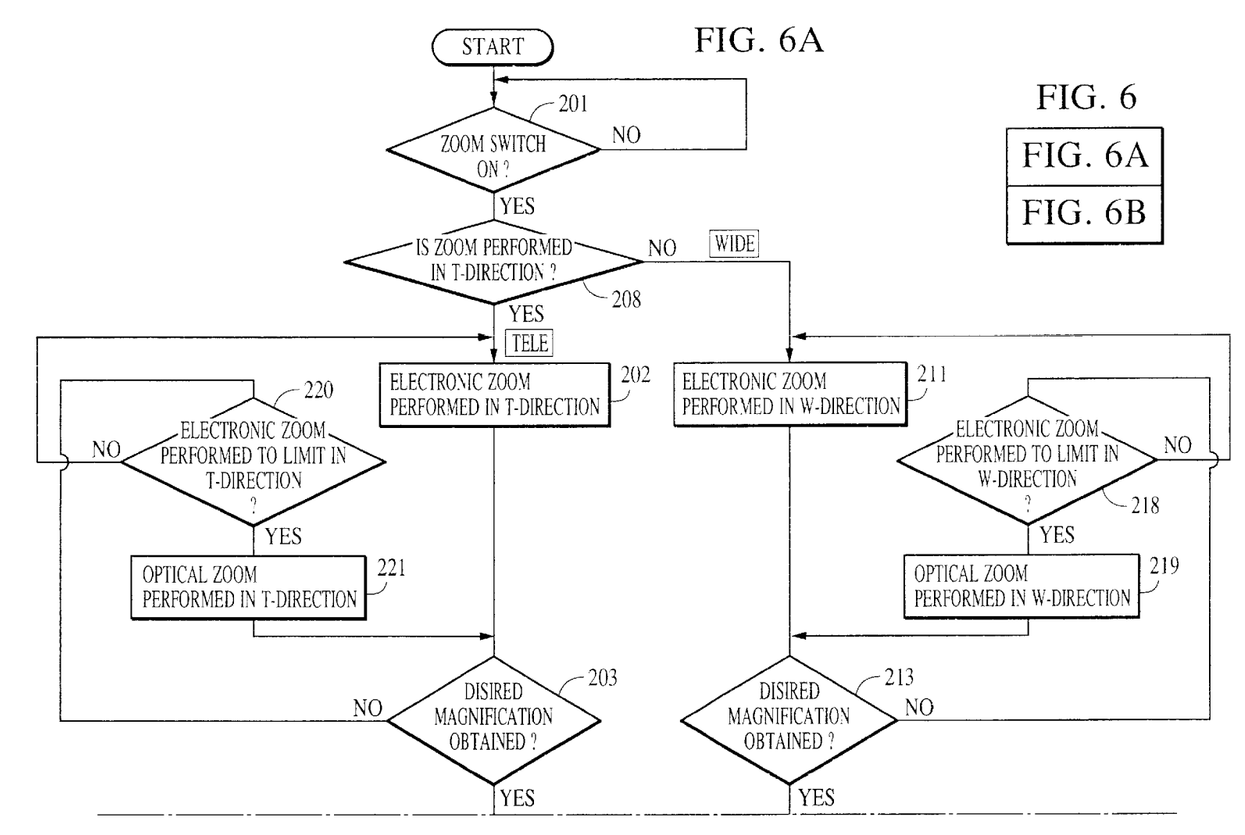
Figure 6B:
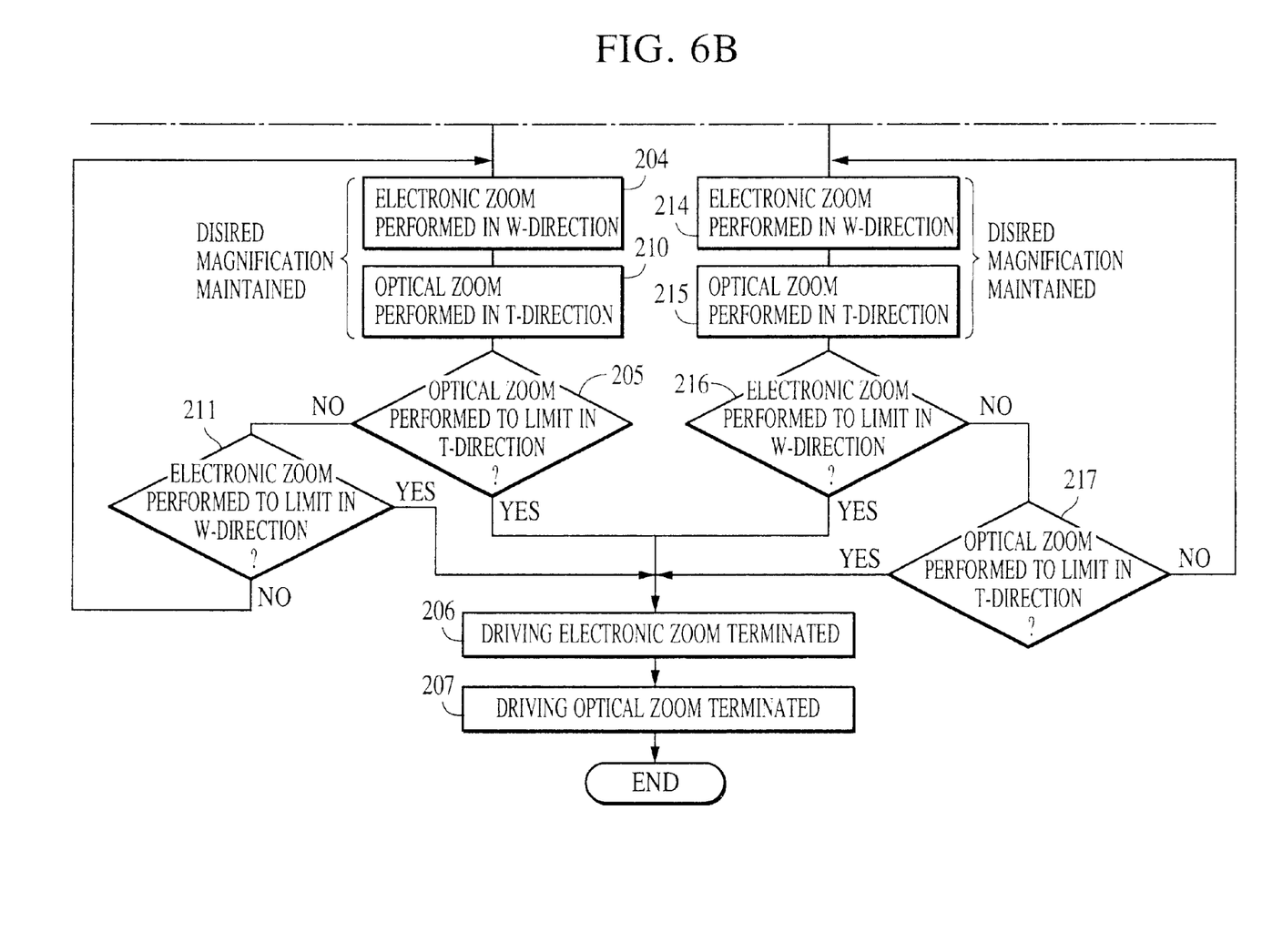

Changes in view angle in accordance with such operations of the electronic zoom and the optical zoom are schematically shown in FIGS. 5A and 5B, and a flowchart of when the view angle changes is shown in FIG. 6. FIGS. 5A and 5B are identical to FIGS. 3A and 3B, respectively, except adjustment of the view angle between points a and b is controlled by only the electronic zoom. Accordingly, descriptions of similarities will be omitted.

As shown in the flowchart of FIG. 6, in order to obtain the desired magnification, when zooming is performed in the tele-direction, initially in step 202, only electronic zooming is performed in the tele-direction, and when the electronic zooming has been performed to its limit (step 220), optical zooming is performed in the tele-direction (step 221). Thereby, the variable range of the view angle is expanded.

When zooming is performed in the wide-direction, only electronic zooming is performed in the wide-direction initially in step 211, and when the electronic zooming has been performed to its limit (step 218), optical zooming is performed in the wide-direction (step 219). Since the other points are similar to those described in FIGS. 3A and 3B, a description thereof will be omitted.

As described above, the electronic zoom enables rapid zooming to a desired view angle. In addition, control of the view angle is transferred to the optical zoom after the desired view angle has been obtained, thus, an image having high resolution can be obtained.

Figure 8:
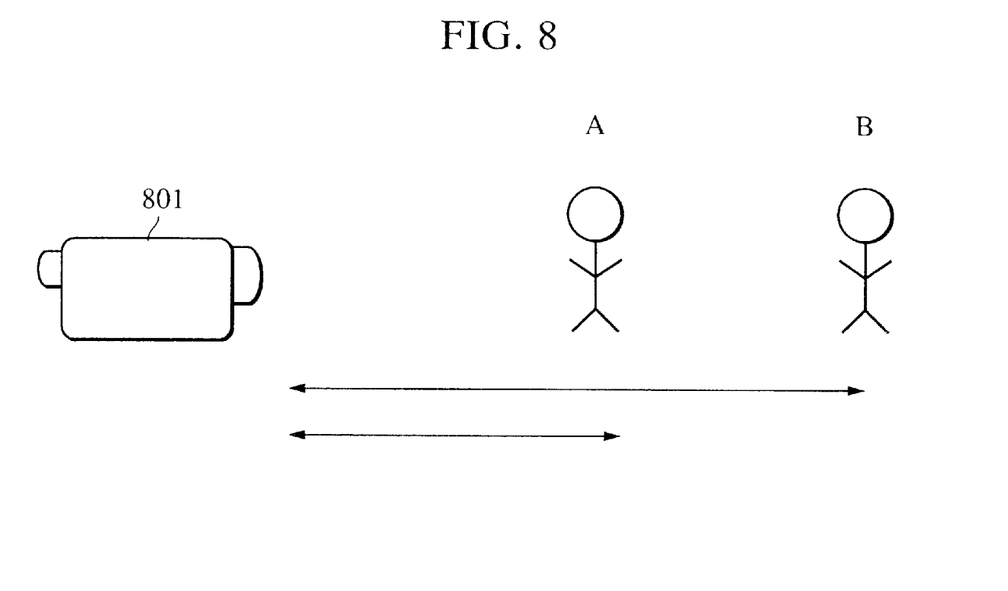
FIG. 8 is a view showing the distance between the image pickup apparatus and a subject.
Figure 9A:
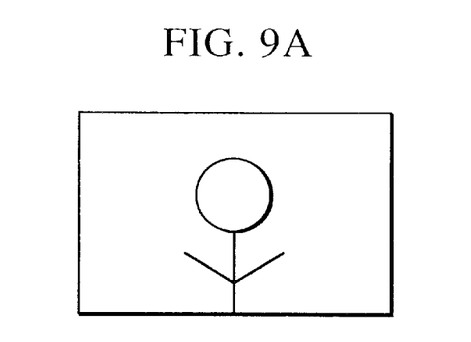
FIG. 9A is a chart showing an image obtained when the subject is at position A.
Figure 9B:
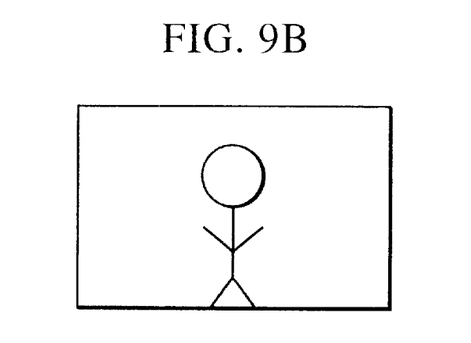
FIG. 9B is a chart showing an image obtained when the subject is at position B.

For example, when the subject moves from A to B as shown in FIG. 8, an image captured by the image pickup apparatus 801 is displayed on a monitor or the like, as shown in FIGS. 9A and 9B.

According to the following embodiment, in which the present invention is applied to an auto-zoom function capable of obtaining a normally constant sized image of a subject as shown in FIG. 9A, by performing optical zooming and electronic zooming even when the distance to the subject changes while the image is being captured, and in spite of a rapid change in the distance to the subject, the size to which the subject image was maintained can be retrieved in a short time by performing optical zooming and electronic zooming. While a view angle corresponding to the size of the subject image is being maintained, successive control of the view angle can substantially be transferred to the optical zoom, thereby the amount of control of the view angle by the electronic zoom is decreased, thus, an image having a high resolution can be obtained.

Figure 7:
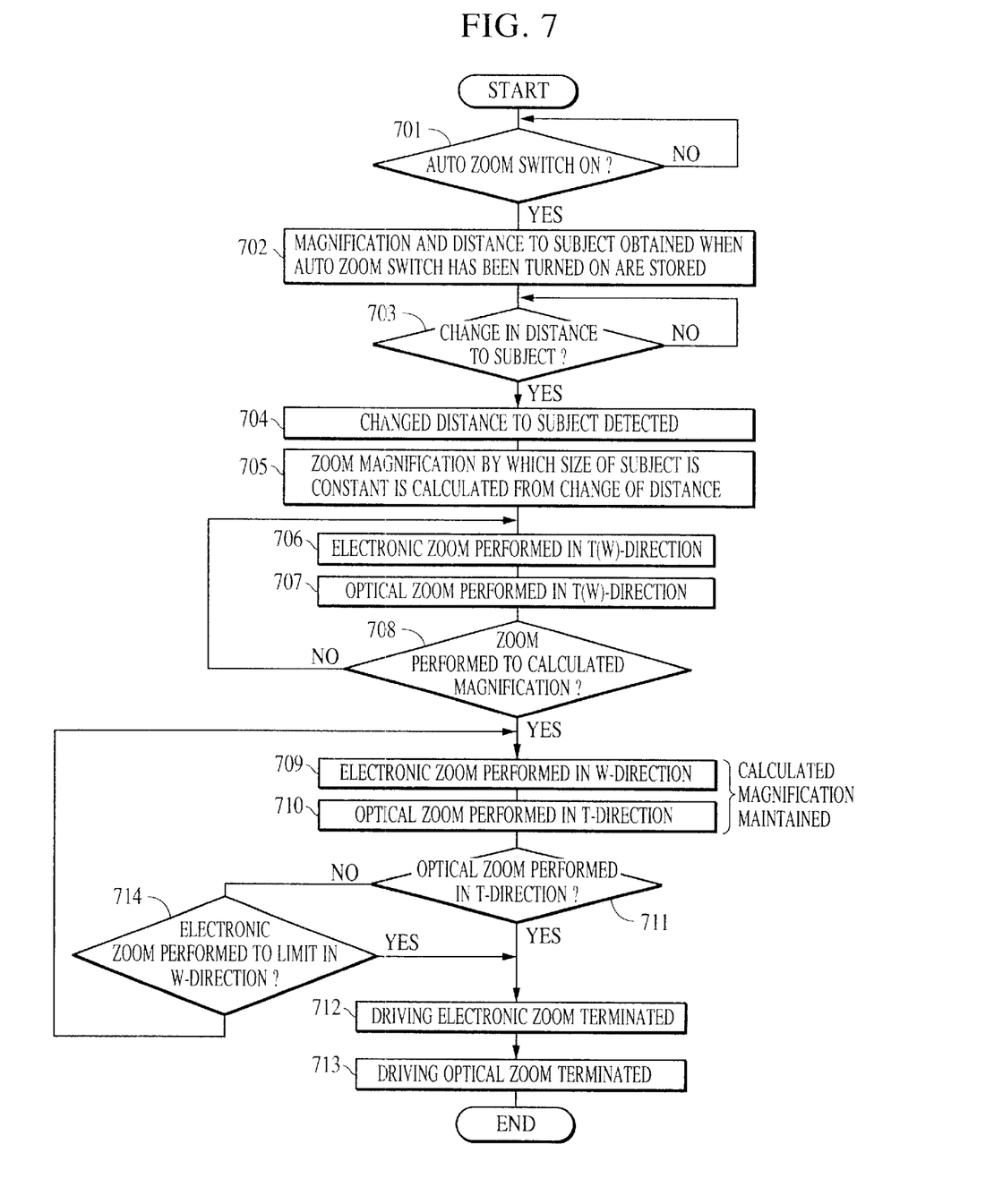
FIG. 7 is a flowchart showing the operations of the optical zoom and the electronic zoom when an auto-zoom is used, according to the embodiment of the present invention.

FIG. 7 shows a flowchart of an operation of an auto-zoom according to the embodiment. The operation will be described by referring to the flowchart.

When the auto-zoom switch 109 in FIG. 1 is turned on (step 701), the magnification of a view angle and the distance to a subject at the time are stored in a storage unit (not shown) (step 702).

In step 703, when the distance between the image pickup apparatus and the subject changes while the image is being captured, change between the distance to the subject (determined when the auto-zoom switch 109 has been turned on) and the present distance to the subject is detected.

The distance to the subject is detected from positional information on a focus lens. In other words, the AF microcomputer 102 functioning as AF means always brings the subject into focus, thus, the distance to the subject can be found by detecting the position of the focus lens.

In step 705, based on the change obtained in step 704, a zoom magnification for making the size of the subject image constant within a screen is calculated by the system control circuit 101 (operation circuit) functioning as maintenance means.

In step 705, when the zoom magnification for maintaining the constant size of the subject image has been determined, the system control circuit 101 transmits drive commands to the electronic zoom microcomputer 111 and the AF microcomputer 102 to simultaneously drive the electronic zoom and the optical zoom in the same direction (together in the tele-direction or wide-direction) (steps 706 and 707, respectively).

In step 708, electronic zooming and optical zooming are performed by the electronic zoom microcomputer 111 and the AF microcomputer 102 until the calculated magnification is obtained, after which electronic zooming is performed in the wide-direction (step 709) and optical zooming is performed in the tele-direction (step 710).

In the process of the above operation, when optical zooming has been performed to its limit in the tele-direction in step 711, the operations of the electronic zoom and the optical zoom are terminated (steps 712 and 713, respectively).

In step 714, when electronic zooming has been performed to its limit in the wide-direction, the electronic zoom and optical zoom operations are terminated (steps 712 and 713, respectively).

According to the above-described image pickup apparatus having an auto-zoom function capable of obtaining a constant sized subject image by performing optical zooming as first adjustment means and electronic zooming as second adjustment means even when the distance to the subject changes, rapid zooming to a calculated magnification for a constant subject image can be realized. In addition, while the calculated magnification is being maintained, control of the view angle is transferred to the optical zoom, which can thus provide an image pickup apparatus capable of obtaining images having high resolution.

The individual components shown in outline or designated by blocks in the Drawings are all well-known in the image recording arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:

first adjustment means for optically adjusting a view angle;

second adjustment means for electronically adjusting the view angle;

command input means for inputting a view-angle change command;

first control means for concurrently driving both said first adjustment means and said second adjustment means in a tele-direction from beginning to end of a view-angle change corresponding to a view-angle change command to zoom in the tele-direction, while said command input means inputs the view-angle change command to zoom in the tele-direction; and second control means for concurrently driving said first adjustment means in the tele-direction, and driving said second adjustment means in a wide-angle direction, while maintaining the view angle corresponding to the view-angle change command, after said command input means inputs the view-angle change command to zoom in the tele-direction.

2. An image pickup apparatus according to claim 1, wherein, when said first adjustment means cannot sufficiently maintain the view angle, said second control means causes said second adjustment means to adjust the view angle with said first adjustment means.

3. An image pickup apparatus according to claim 1, wherein said first adjustment means comprises a zoom lens for optically changing the magnification of an image of an object.

4. An image pickup apparatus according to claim 1, wherein said second adjustment means comprises an electronic zoom processing circuit for electronically changing the magnification of an image of an object.

5. An image pickup apparatus according to claim 1, wherein, when at least one of said first adjustment means and said second adjustment means is driven to the limit thereof, said second control means terminates the driving of said first adjustment means and said second adjustment means.

6. An image pickup apparatus comprising:

a zoom lens for optically adjusting a view angle;

an image pickup device for capturing an image of an object through said zoom lens;

an electronic zoom processing circuit for electronic zoom processing an output signal obtained from said image pickup device;

a zoom switch for inputting a view-angle change command; and a control circuit that concurrently drives both said zoom lens and said electronic zoom processing circuit from beginning to end of a view angle change in a tele-direction corresponding to a view-angle change command to zoom in the tele-direction, while said zoom switch inputs the view-angle change command to zoom in the tele-direction, and wherein thereafter said control circuit concurrently drives said zoom lens in the tele-direction, and drives said electronic zoom processing circuit in a wide-angle direction, while maintaining the view angle corresponding to the view-angle change command.

7. An image pickup apparatus according to claim 6, wherein, when said zoom lens cannot sufficiently maintain the view angle, said control circuit causes said electronic zoom processing circuit to adjust the view angle with said zoom lens.

8. An image pickup apparatus according to claim 6, wherein, when at least one of said zoom lens and said electronic zoom processing circuit is driven to the limit thereof, said control circuit terminates the driving of said zoom lens and said electronic zoom processing circuit.

9. An image pickup apparatus comprising:

a zoom lens for optically adjusting a view angle;

an image pickup device for capturing an image of an object through said zoom lens;

an electronic zoom processing circuit for electronic zoom processing an output signal obtained from said image pickup device;

a zoom switch for inputting a view-angle change command; and a control circuit that concurrently drives both said zoom lens and said electronic zoom processing circuit from beginning to end of a view angle change in a tele-direction corresponding to a view-angle change command to zoom in the tele-direction, while said zoom switch inputs the view-angle change command to zoom in the tele-direction.

10. A method for picking up an image comprising the steps of:

optically adjusting a view angle using a zoom lens;

capturing an image of an object through the zoom lens using an image pickup device;

electronic zoom processing an output signal obtained in said capturing step using an electronic zoom processing circuit;

inputting a view-angle change command; and concurrently driving both the zoom lens and the electronic zoom processing circuit from beginning to end of a view angle change in a tele-direction corresponding to a view-angle change command to zoom in the tele-direction, while the view-angle change command to zoom in the tele-direction is input in said view-angle inputting step.

* * * * *

UNITED STATES PATENT AND TRADEMARK OFFICE
CERTIFICATE OF CORRECTION

PATENT NO. : 6,757,013 B2
DATED : June 29, 2004
INVENTOR(S) : Kazuhiro Matsuzaka It is certified that error appears in the above-identified patent and that said Letters Patent is hereby corrected as shown below:

Title page,
Item [56], References Cited, FOREIGN PATENT DOCUMENTS,
"JP     541092 A2   12/1993
 JP     579165 A1   1/1994" should read
-- EP   541092 A2   12/1993
  EP    579165 A1   1/1994 --.

Column 4,
Line 8, "6B" should read -- 6B, --.

Signed and Sealed this

Twenty-third Day of November, 2004

JON W. DUDAS
*Director of the United States Patent and Trademark Office*